United States Patent
Fujii et al.

(10) Patent No.: US 6,705,616 B2
(45) Date of Patent: Mar. 16, 2004

(54) PISTON RING DEVICE IN INTERNAL COMBUSTION ENGINE

(75) Inventors: Noriaki Fujii, Wako (JP); Kinya Fujii, Wako (JP); Kazuyuki Seko, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/189,194

(22) Filed: Jul. 5, 2002

(65) Prior Publication Data
US 2003/0015163 A1 Jan. 23, 2003

(30) Foreign Application Priority Data
Jul. 9, 2001 (JP) .................................. 2001-208207

(51) Int. Cl.[7] .......................... B60T 11/236; F02F 5/00
(52) U.S. Cl. .................. 277/434; 277/435; 277/467; 277/469
(58) Field of Search ................... 277/434, 435, 277/467, 469, 470, 476

(56) References Cited
U.S. PATENT DOCUMENTS

| | | | | |
|---|---|---|---|---|
| 1,586,575 A | * | 6/1926 | Paynard | 277/446 |
| 2,321,791 A | * | 6/1943 | Beardsley | 277/447 |
| 2,767,038 A | * | 10/1956 | Brown | 277/453 |
| 4,179,131 A | * | 12/1979 | Nussbaumer | 277/468 |
| 4,280,708 A | * | 7/1981 | Arai | 277/453 |
| 4,475,739 A | * | 10/1984 | Nakajima et al. | 277/442 |
| 4,681,326 A | * | 7/1987 | Kubo | 277/447 |

* cited by examiner

Primary Examiner—Anthony Knight
Assistant Examiner—Enoch Peavey
(74) Attorney, Agent, or Firm—Armstrong, Kratz, Quintos, Hanson & Brooks, LLP

(57) ABSTRACT

In order to increase in concentration of HC in an exhaust gas due to an axial gap between a ring groove and a piston ring, when an internal combustion engine is at a lower temperature, particularly, during the starting or the low-speed operation of the internal combustion engine in which the moving speed of a piston is lower, a restricting ring having a radially outward tension is inserted in a wedge shape into between axially opposed surfaces of a ring groove and a piston ring so that in a lower-speed operational range of a piston, the axial movement of the piston ring within the ring groove is restricted by the wedging action of the restricting ring, and in a higher-speed operational range of the piston, the wedging action of the restricting ring is removed by a floating force of the piston ring generated with the descending movement of the piston.

4 Claims, 6 Drawing Sheets

DURING ASCENDING OF PISTON (LOWER SPEED)

DURING ASCENDING OF PISTON (HIGHER SPEED)

DURING ASCENDING OF PISTON (LOWER SPEED)

DURING DESCENDING OF PISTON (LOWER SPEED)

Fb > Fa

DURING ASCENDING OF PISTON (HIGHER SPEED)

DURING DESCENDING OF PISTON (HIGHER SPEED)

Fb < Fa

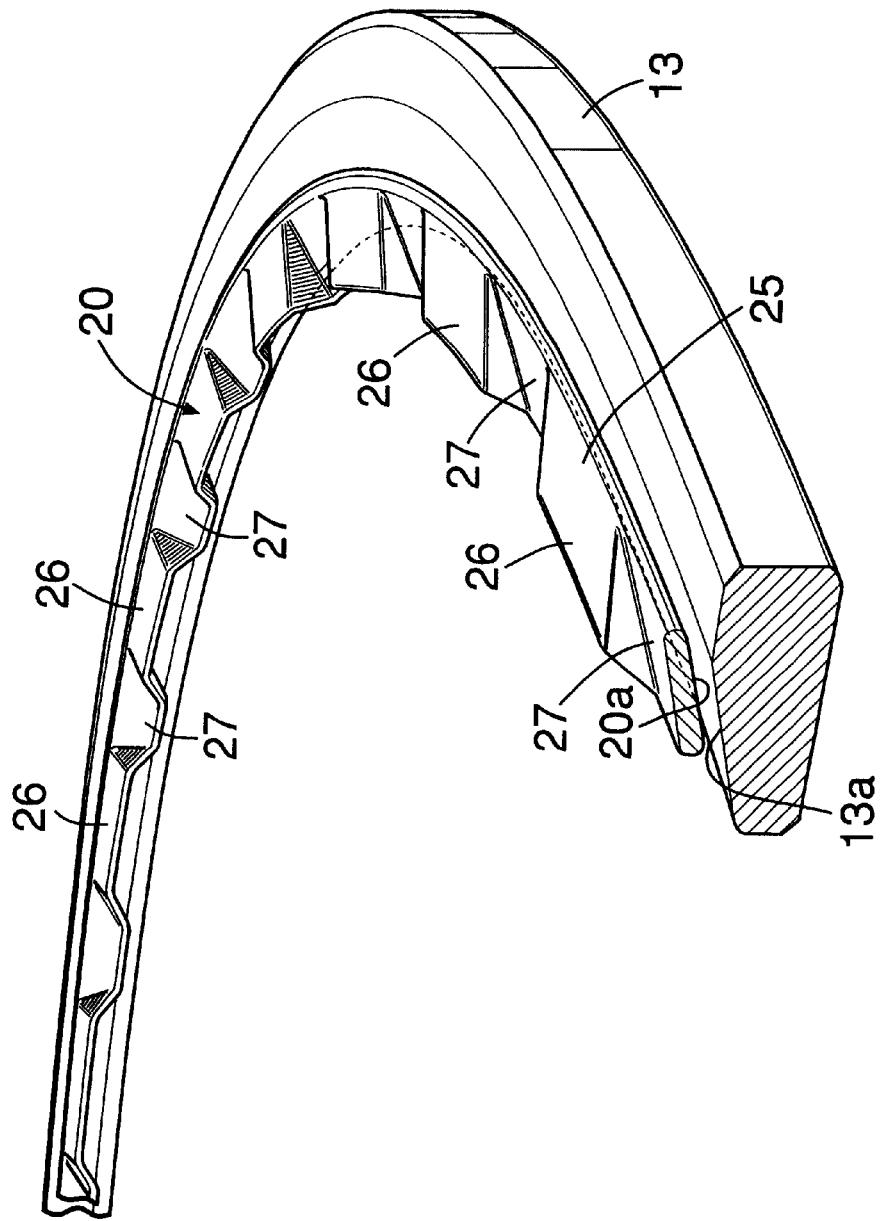

DURING ASCENDING OF PISTON

IMMEDIATELY BEFORE TOP DEAD CENTER OF PISTON

PISTON RING DEVICE IN INTERNAL COMBUSTION ENGINE

BACKGROUND OF THE INVENTION

1. Field of the Invention

The present invention relates to a piston ring device in an internal combustion engine in which a piston ring is mounted in a ring groove in a piston to come into sliding close contact with an inner wall of a cylinder bore with a predetermined axial gap.

2. Description of the Related Art

The axial gap between the ring groove and the piston ring assumes an important role for ensuring that the piston ring is in close contact with the inner wall of the cylinder bore without being stuck in the ring groove even upon thermal expansion thereof to achieve a good gas sealing function.

However, it has been found by the present inventors that the axial gap is one factor for increasing the concentration of HC in an exhaust gas during the starting or the low-speed operation of the internal combustion engine in a lower-temperature state. This is due to the following reason:

In a conventional piston ring device, as shown in FIGS. 6A and 6B, a piston ring 13 (a compressing ring) mounted in an upper ring groove 10 in a piston 3 is always movable in a range corresponding to an axial gap g between the ring groove 10 and the piston ring 13. Therefore, during ascending of the piston 3 (see FIG. 6A), the piston ring 13 is pushed against a lower surface of the ring groove 10 by its inertial force and a frictional resistance between the ring 13 and the inner wall of the cylinder bore to generate the axial gap g above the piston ring 13. During descending of the piston 3 (see FIG. 6B), the piston ring 13 is pushed against an upper surface of the ring groove 10 by the inertial force and the frictional resistance to shift the gap g to below the piston ring 13.

When the internal combustion engine is at a lower temperature, unburned fuel f deposited to the inner wall of the cylinder is drawn into the gap g generated above the piston ring 13 during ascending of the piston in an exhaust stroke. When the piston ring 13 ascends relative to the piston 3 with its ascending inertial force overcoming the frictional resistance between the ring 13 and the inner wall of the cylinder immediately before a top dead center where the ascending speed of the piston 3 increased suddenly, the unburned fuel f is forced out of the gap g. The unburned fuel f is discharged into an exhaust port along with an exhaust gas to increase the concentration of HC in the exhaust gas.

SUMMARY OF THE INVENTION

The present invention has been achieved with such circumstance in view, and it is an object of the present invention to provide a piston ring device in an internal combustion engine, wherein when the internal combustion engine is at a lower temperature, particularly, during the starting or the low-speed operation of the internal combustion engine in which the moving speed of a piston is lower, an increase in concentration of HC in an exhaust gas due to an axial gap between a ring groove and a piston ring can be inhibited.

To achieve the above object, according to a first aspect and feature of the present invention, there is provided a piston ring device in an internal combustion engine in which a piston ring is mounted in a ring groove in a piston to come into sliding close contact with an inner wall of a cylinder bore with a predetermined axial gap, wherein a ring restricting means is mounted in the ring groove for restricting an axial movement of the piston ring in the ring groove in a lower-speed operational range of the piston, such restriction being removed in a higher-speed operational range of the piston.

The ring groove and the piston correspond to an upper ring groove 10 and a first compression ring 13 in embodiments of the present invention which will be described hereinafter.

With the first feature, in the lower-speed operational range of the piston, the axial movement of the piston ring in the ring groove is restricted by the ring restricting means and hence, in a lower-temperature and lower-speed operational range of the internal combustion engine, unburned fuel deposited to the inner surface of the cylinder bore cannot flow into and out of the ring groove with the ascending and descending movements of the piston. Therefore, even during an exhaust stroke, the unburned fuel is not released to the outside and hence, it is possible to prevent an increase in concentration of HC in an exhaust gas.

In the higher-speed operational range of the piston, the restriction provided by the ring restricting means is removed and hence, the piston ring can be moved freely vertically within the ring groove and thus prevented from being stuck in the ring groove, thereby exhibiting its intrinsic gas sealing function.

According to a second aspect and feature of the present invention, in addition to the first feature, the ring restricting means comprises a restricting ring which is inserted in a wedge shape between axially opposed surfaces of the ring groove and the piston ring and which has a tension in a direction of insertion, whereby in the lower-speed operational range of the piston, the axial movement of the piston ring within the ring groove is restricted by the wedging action of the restricting ring, and in the higher-speed operational range of the piston, the wedging action of the restricting ring is removed by a floating force of the piston ring generated with the descending movement of the piston.

With the second feature, the ring restricting means can be formed simply by a single member which is the restricting ring and hence, it is possible to prevent an increase in cost for the piston ring device due to the addition of the ring restricting means to a small level.

According to a third aspect and feature of the present invention, in addition to the second feature, mutually opposed surfaces of the piston ring and the restricting ring have slants formed thereon, respectively, so that the restricting ring performs the wedging action.

With the third feature, the restriction of the axial movement of the piston ring can be achieved properly by the wedging action of the restricting ring.

According to a fourth aspect and feature of the present invention, in addition to the third feature, the restricting ring is formed by forming, on an annular flat plate, a plurality of flat portions adapted to contact with an inner surface of the ring groove, and a plurality of inclined portions each having a slant adapted to contact with the slant of the piston ring so that both of the portions are arranged alternately in a circumferential direction.

With the fourth feature, a lightweight restricting ring having a high rigidity can be provided at a low cost using the annular flat plate as a material.

BRIEF DESCRIPTION OF THE DRAWINGS

FIG. 5 is a view similar to FIG. 4, but showing a second embodiment of the present invention.

DETAILED DESCRIPTION OF THE PREFERRED EMBODIMENTS

The present invention will now be described by way of preferred embodiments of the present invention with reference to the accompanying drawings.

A first embodiment of the present invention shown in FIGS. 1 to 4 will be described.

Figure 1:
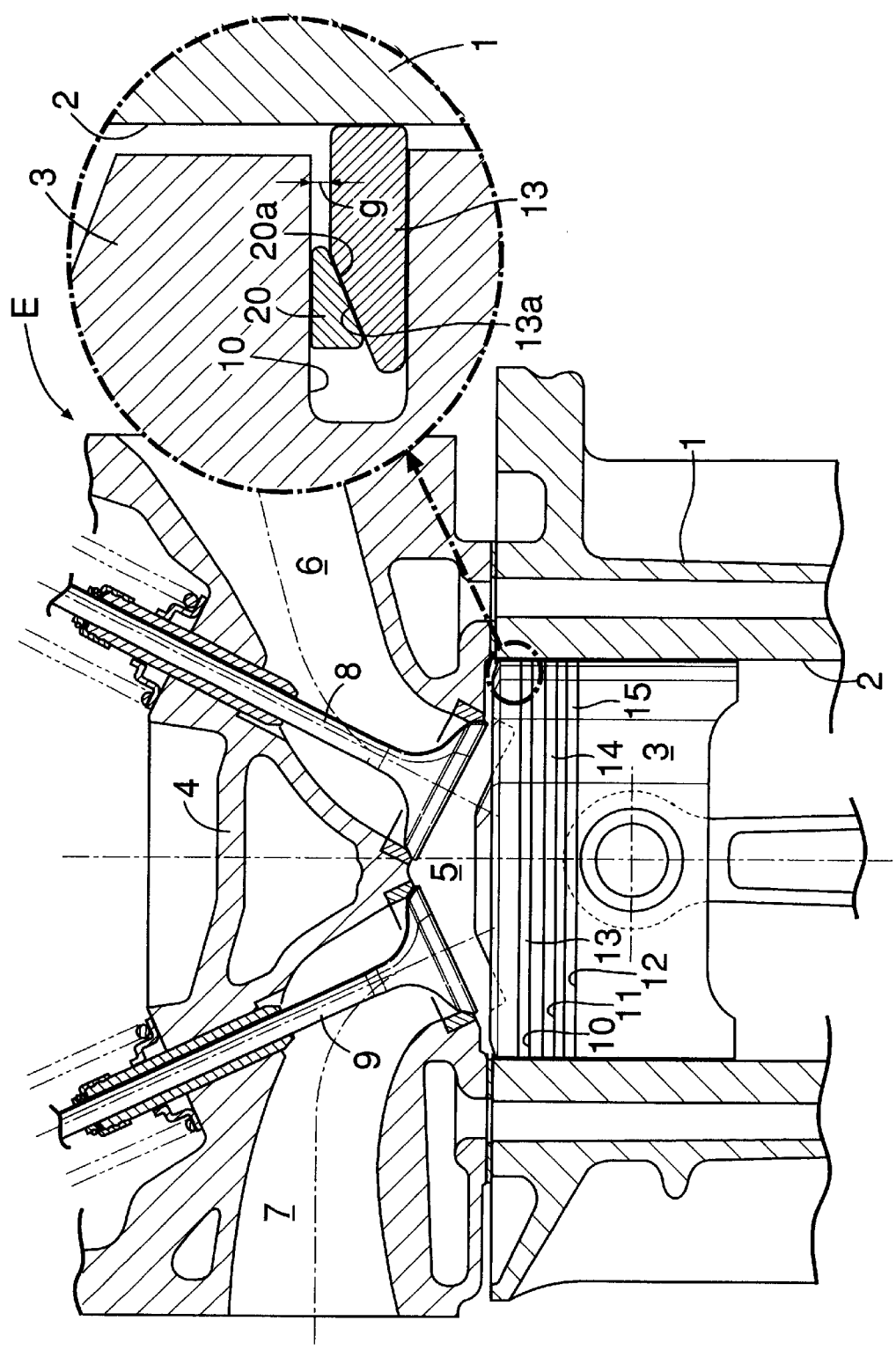
FIG. 1 is a vertical sectional view of an internal combustion engine provided with a piston ring device according to a first embodiment of the present invention.

Referring to FIG. 1, a piston 3 is slidably received in a cylinder bore 2 in a cylinder block 1 of an internal combustion engine E. A cylinder head 4 coupled to an upper end face of the cylinder block 1 is provided with a combustion chamber 5 leading to an upper end of the cylinder bore 2, and intake and exhaust ports 6 and 7 which open into the combustion chamber 5. Intake and exhaust valves 8 and 9 for opening and closing open ends of the ports 6 and 7 adjacent the combustion chamber 5 are mounted in the cylinder head 4.

An upper ring groove 10, an intermediate ring groove 11 and a lower ring groove 12 are defined in an outer peripheral surface of the piston 3 in the named order from the side of the combustion chamber 5. A first compression ring 13 is mounted in the upper ring groove 10. A second compression ring 14 is mounted the intermediate ring groove 11, and an oil ring 15 is mounted in the lower ring groove 12. Each of the rings 13 to 15 has a single abutment (not shown) so that it can be put slidably in close contact with an inner wall of the cylinder bore 2 by the tension of the ring itself, as usual. A predetermined axial gap g is provided along an axis of the cylinder bore 2 between each of the ring grooves 10 to 12 and each of the rings 13 to 15, as usual.

As shown in FIGS. 1 to 4, a slant 13a is formed on an upper surface of the first compressing ring 13 and declined from a radially intermediate portion of the upper surface toward a radially inner portion of the upper surface, and a restricting ring 20 (a restricting means) is inserted in a wedge shape between the slant 13a and an upper surface of the upper ring groove 10. The restricting ring 20 has a lower surface 20a formed as a slant declined toward a radially inner portion of the lower surface 20a in correspondence to the slant 13a. The restricting ring 20 also has an upper surface formed as a flat surface parallel to an upper surface of the ring groove 10. A single abutment (not shown) is also provided in the restricting ring 20, and a radially outward tension is provided to the restricting ring 20, so that the restricting ring 20 is thrust into between the slant 13a of the first compressing ring 13 and the upper surface of the upper ring groove 10. The magnitude of the tension of the restricting ring 20 and the angles of the slants 13a and 20a are set so that the restricting ring 20 exhibits a wedging function of pushing the first compressing ring 13 against the lower surface of the upper ring groove 10 in a lower-speed operational range of the piston 3, and the wedging action of the restricting ring 20 is invalidated by a floating force Fa of the first compressing ring 13 produced with the descending movement of the piston 3 in a higher-speed operational range of the piston 3.

The operation of the first embodiment will be described below with reference to FIGS. 2 and 3.

Figure 2A:
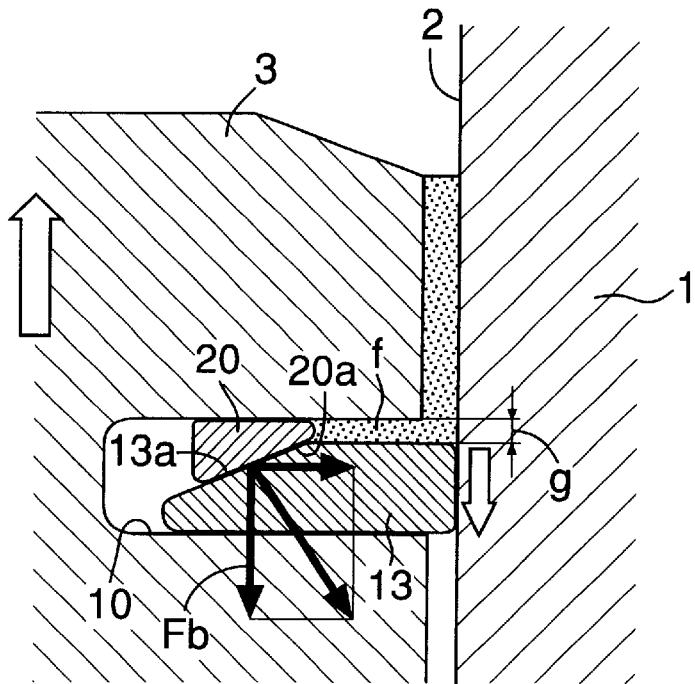
FIGS. 2A and 2B are views for explaining the operation of the piston ring device of the present invention in a lower-speed operational range of the internal combustion engine.
Figure 2B:
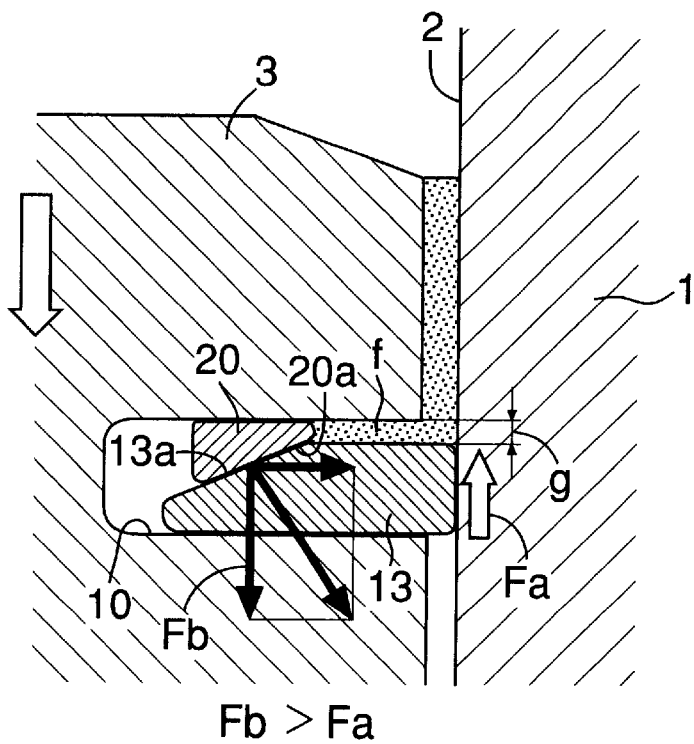

As shown in FIG. 2A, when the moving speed of the piston 3 is low, the restricting ring 20 is thrust between the slant 13a and the upper surface of the upper ring groove 10 with the wedging function provided by its own tension to push the first compression ring 13 against the lower surface of the upper ring groove 10. Especially, even during descending of the piston 3, the floating force Fa attributable to an inertial force of the first compression ring 13 as well as a frictional resistance between the ring 13 and the inner wall of the cylinder bore 2 is relatively small and hence, a pushing-down force Fb of the first compression ring 13 provided by the wedging action of the restricting ring 20 overcomes the floating force Fa to continuously push the first compression ring 13 against the lower surface of the upper ring groove 10. This means that the restricting ring 20 can inhibit the compression ring 13 from ascending relative to the piston 3 by an ascending inertial force immediately before a top dead center where the ascending speed of the piston 3 is suddenly reduced.

As a result, the axial movement of the first compression ring 13 within the upper ring groove 10 is restricted, despite the presence of the axial gap g between the first compressing ring 13 and the upper surface of the upper ring groove 10. Therefore, in a lower-temperature and lower-speed operational range of the internal combustion engine E, even if an unburned fuel f deposited to the inner wall of the cylinder bore 2 is introduced into the gap g with the ascending (see FIG. 2) of the piston 3, the first compression ring 13 is not moved from the lower surface of the upper ring groove 10 even during subsequent descending (see FIG. 2) of the piston 3 from a point immediately before the top dead center and hence, the unburned fuel f is continued to be retained in the gap g and is not released to the outside even during an exhaust stroke. Thus, it is possible to prevent the concentration of HC in an exhaust gas from being increased in the lower-temperature and lower-speed operational range of the internal combustion engine E.

Figure 3A:
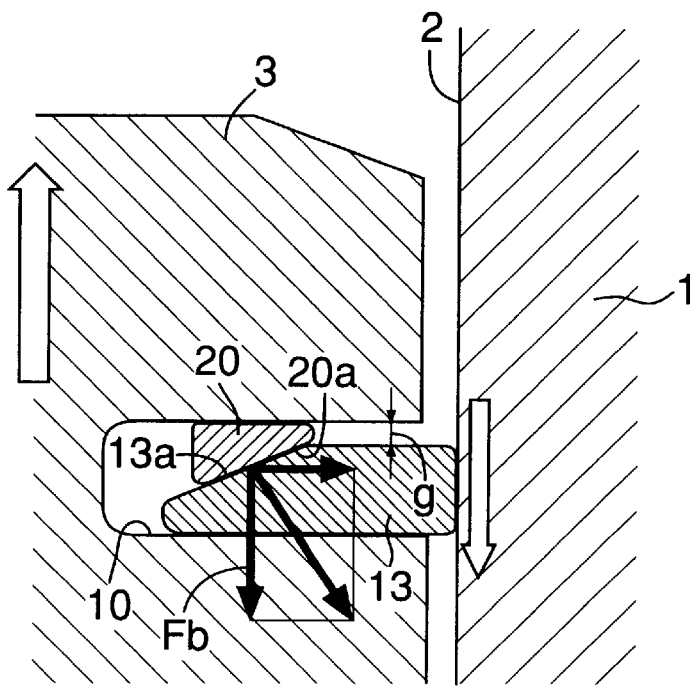
FIGS. 3A and 3B are views for explaining the operation of the piston ring device of the present invention in a higher-speed operational range of the internal combustion engine.
Figure 3B:
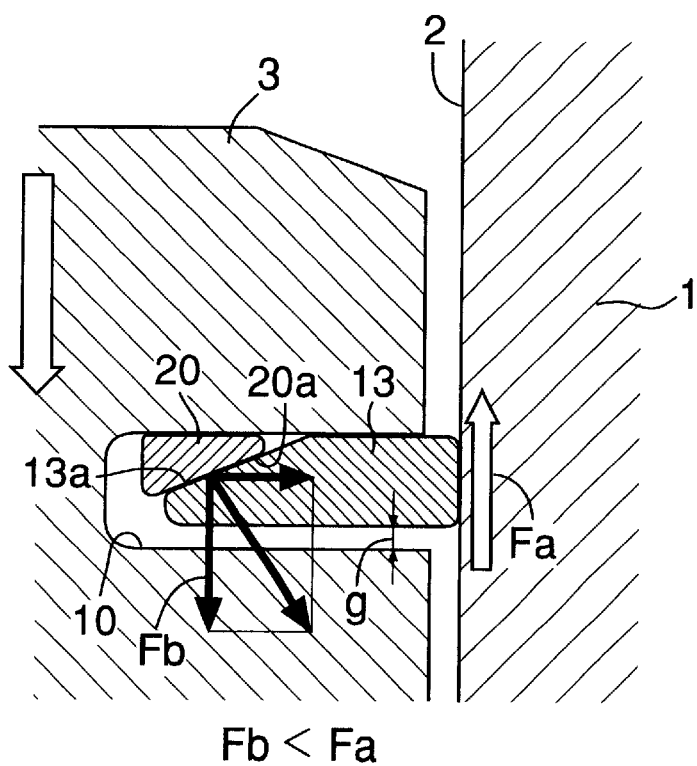
Figure 4:
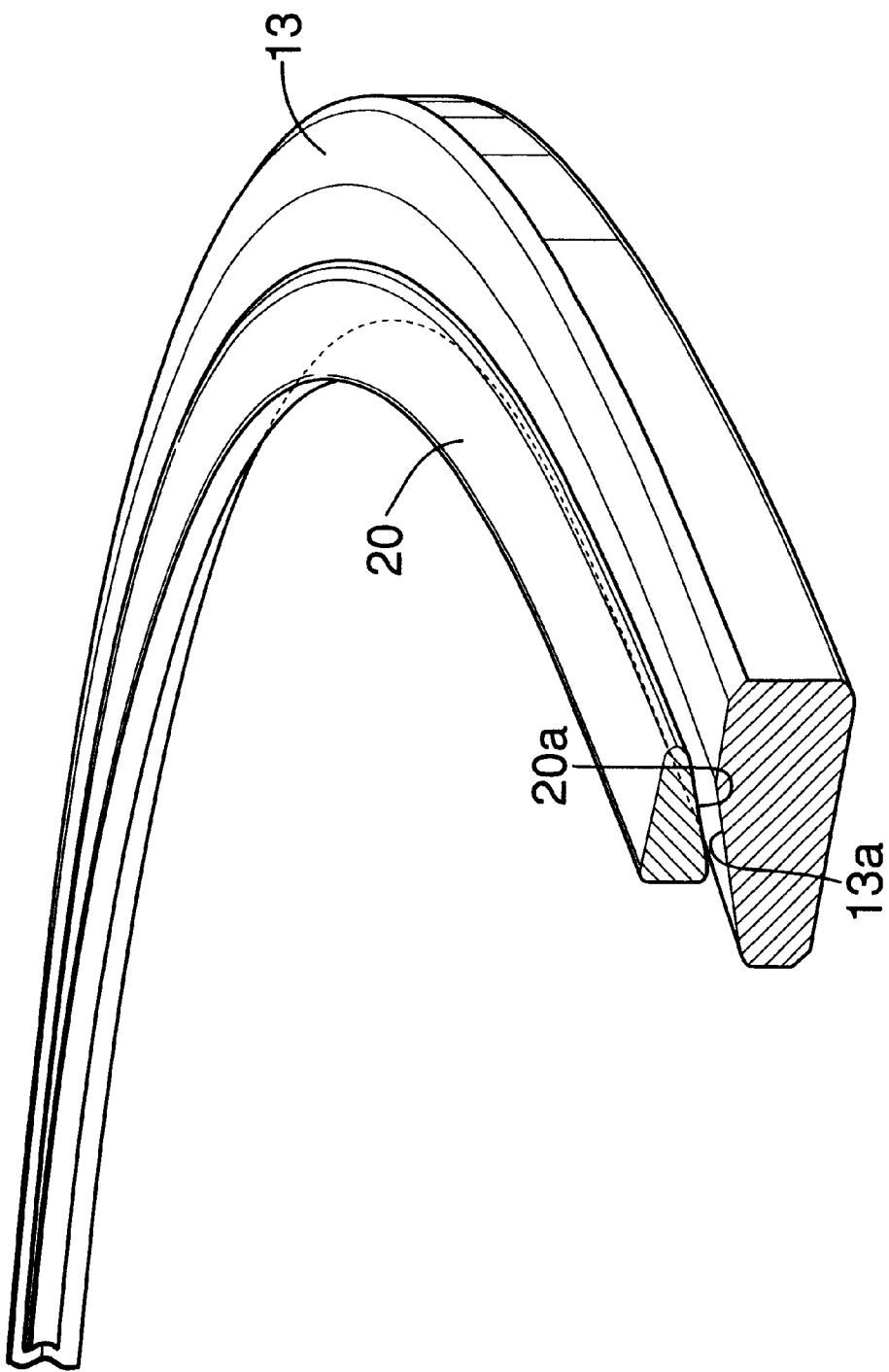
FIG. 4 is a perspective view of a first compressing ring and a restricting ring.
Figure 6A:
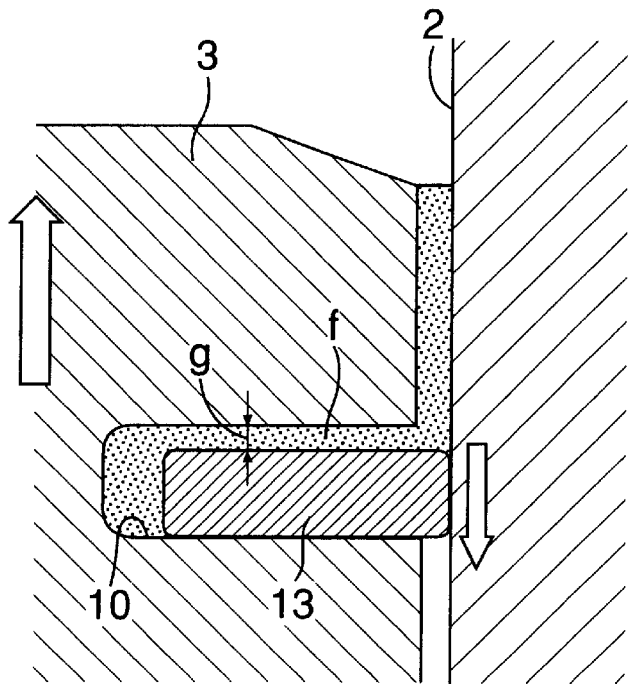
FIGS. 6A and 6B are vertical sectional views showing the arrangement and operation of a piston ring device of a conventional internal combustion engine.
Figure 6B:
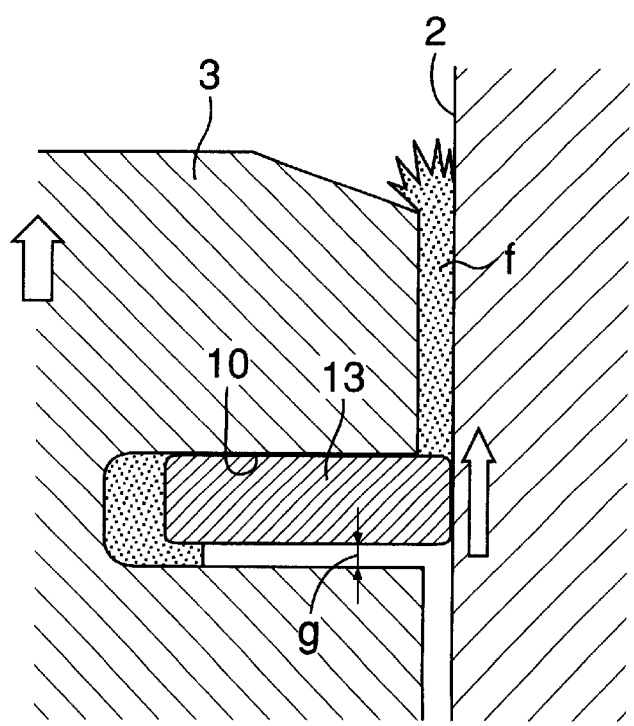

When the moving speed of the piston 3 is subsequently increased to a predetermined value or more, the floating force Fa of the piston 3 overcomes the pushing-down force Fb of the first compression ring 13 provided by the wedging action of the restricting ring 20 during descending of the piston 3, especially due to an increase in inertial force of the first compression ring 13 to push back the restricting ring 20 radially inwards, thereby invalidating the wedging action of the restricting ring 20, as shown in FIG. 3A. As a result, the first compression ring 13 is moved, until it abuts against the upper surface of the upper ring groove 10, and the axial gap g is shifted to below the first compression ring 13. Therefore, the first compression ring 13 is moved vertically in a range corresponding to the axial gap g within the upper ring groove 10 with the ascending and the descending of the piston 3, as shown in FIGS. 3A and 3B, and a fuel-air mixture and a lubricating oil can be introduced moderately into the upper ring groove 10 from above and from below, respectively to cooling and lubricate the first compression ring 13. Thus, it is possible to prevent the sticking of the compression ring 13 within the upper ring groove 10 and to exhibit the intrinsic gas sealing function of the ring 13.

If the internal combustion engine E is brought into a high-temperature state, the fuel in contact with the inner wall of the cylinder bore 2 having a high temperature is vaporized immediately and burned completely. Therefore, even if the first compression ring 13 is brought in a state in which it can be moved freely within the upper ring groove 10, as described above, the concentration of HC in the exhaust gas cannot be increased.

A second embodiment of the present invention shown in FIG. 5 will now be described. In the second embodiment, a restricting ring 20 is formed from an annular flat plate 25. More specifically, the restricting ring 20 is formed by forming, on the annular flat plate, a plurality of flat portions 26 adapted to contact with an upper surface of an upper ring groove 10 and a plurality of inclined portions 27, each having a slant 20a adapted to contact with a slant 3a of a first compression ring 13 so that they are arranged alternately in a circumferential direction. The other arrangement is the same as in the previously described embodiment and hence, portions and components are designated by the same reference numerals in FIG. 5, and the description of them is omitted.

With the second embodiment, the restricting ring 20 can be fabricated by subjecting the flat plate 26 having a constant thickness to a pressing and moreover, a bent portion between each of the flat portions 26 and each of the inclined portion exhibits a reinforcing rib effect to enhance the surface rigidity of the restricting ring 20 effectively. Therefore, the lightweight restricting ring 20 having a high rigidity can be provided at a low cost.

The present invention is not limited to the above-described embodiments, and various modifications in design may be made without departing from the subject matter of the present invention. For example, the positions of the compression ring 13 and the restricting ring 20 may be reversed vertically, whereby the axial movement of the first compression ring 13 can be restricted from below.

As discussed above, according to a first feature of the present invention, in the piston ring device in the internal combustion engine in which the piston ring is mounted in the ring groove in the piston to come into sliding close contact with the inner wall of a cylinder bore with the predetermined axial gap, the ring-restricting means is mounted in the ring groove and adapted to restrict the axial movement of the piston ring in the ring groove in the lower-speed operational range of the piston and to remove such restriction in the higher-speed operational range of the piston. Therefore, in the lower-temperature and lower-speed operational range of the internal combustion engine, unburned fuel deposited to the inner surface of the cylinder bore cannot flow into and out of the ring groove with the ascending and descending movements of the piston. Therefore, even during the exhaust stroke, the unburned fuel is not released to the outside and hence, it is possible to prevent an increase in concentration of HC in an exhaust gas. Moreover, in the higher-speed operational range of the internal combustion engine, the restriction provided by the ring restricting means is removed and hence, the piston ring can be moved freely vertically within the ring groove and thus prevented from being stuck in the ring groove, thereby exhibiting its intrinsic gas sealing function.

According to a second aspect and feature of the present invention, in addition to the first feature, the ring restricting means comprises the restricting ring which is inserted in the wedge shape between the axially opposed surfaces of the ring groove and the piston ring and which has the tension in the direction of insertion, whereby in the lower-speed operational range of the piston, the axial movement of the piston ring within the ring groove is restricted by the wedging action of the restricting ring, and in the higher-speed operational range of the piston, the wedging action of the restricting ring is removed by the floating force of the piston ring generated with the descending movement of the piston. Therefore, the ring restricting means is formed simply by the single member which is the restricting ring and hence, it is possible to suppress an increase in cost for the piston ring device due to the addition of the ring restricting means to a small level.

According to a third feature of the present invention, in addition to the second feature, the mutually opposed surfaces of the piston ring and the restricting ring have slants formed thereon so that the restricting ring performs the wedging action. Therefore, the restriction of the axial movement of the piston ring can be achieved properly by the wedging action of the restricting ring.

According to a fourth feature of the present invention, in addition to the third feature, the restricting ring is formed by forming, on the annular flat plate, the plurality of flat portions adapted to contact with the inner surface of the ring groove, and the plurality of inclined portions each having the slant adapted to contact with the slant of the piston ring so that both of the portions are arranged alternately in the circumferential direction. Therefore, the lightweight restricting ring having a high rigidity can be provided at the low cost using the annular flat plate as the material.

What is claimed is:

1. A piston ring device in an internal combustion engine in which a piston ring is mounted in a ring groove having a rectangular cross-section in a piston with a predetermined axial gap between the piston ring and the ring groove to come into sliding close contact with an inner wall of a cylinder bore, said piston ring device comprising a ring restricting means mounted in the ring groove for restricting an axial movement of the piston ring in the ring groove in a lower-speed operational range of the piston, such restriction being removed in a higher-speed operational range of the piston.

2. The piston ring device in an internal combustion engine according to claim 1, wherein said ring restricting means comprises a restricting ring which is inserted in a wedge shape into between axially opposed surfaces of the ring groove and the piston ring and which has a tension in a direction of insertion, whereby in the lower-speed operational range of the piston, the axial movement of the piston ring within the ring groove is restricted by the wedging action of the restricting ring, and in the higher-speed operational range of the piston, the wedging action of the restricting ring is removed by a floating force of the piston ring generated with the descending movement of the piston.

3. The piston ring device in an internal combustion engine according to claim 2, wherein mutually opposed surfaces of the piston ring and the restricting ring have slants formed thereon, respectively, so that the restricting ring performs the wedging action.

4. The piston ring device in an internal combustion engine according to claim 3, wherein the restricting ring is formed by forming, on an annular flat plate, a plurality of flat portions adapted to contact with an inner surface of the ring groove, and a plurality of inclined portions each having the slant adapted to contact with the slant of the piston ring so that both of the portions are arranged alternately in a circumferential direction.

* * * * *